(12) United States Patent  
Plagemann et al.

(10) Patent No.: US 9,087,241 B2  
(45) Date of Patent: *Jul. 21, 2015

(54) INTELLIGENT PART IDENTIFICATION FOR USE WITH SCENE CHARACTERIZATION OR MOTION CAPTURE

(71) Applicant: The Board of Trustees of the Leland Stanford Junior University, Palo Alto, CA (US)

(72) Inventors: Christian Plagemann, Menlo Park, CA (US); Hariraam Varun Ganapathi, Palo Alto, CA (US); Sebastian Thrun, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,898

(22) Filed: Dec. 4, 2013

(65) Prior Publication Data

US 2014/0133740 A1     May 15, 2014

Related U.S. Application Data

(63) Continuation of application No. 12/712,914, filed on Feb. 25, 2010, now Pat. No. 8,611,670.

(51) Int. Cl.  
*G06K 9/46* (2006.01)  
*G06K 9/00* (2006.01)  
*G06K 9/62* (2006.01)  
*G06T 7/20* (2006.01)  
*G06T 17/20* (2006.01)

(52) U.S. Cl.  
CPC ........ *G06K 9/00718* (2013.01); *G06K 9/00342* (2013.01); *G06K 9/6215* (2013.01); *G06K 9/6267* (2013.01); *G06T 7/2046* (2013.01); *G06T 17/205* (2013.01); *G06T 2207/10028* (2013.01); *G06T 2207/30196* (2013.01)

(58) Field of Classification Search  
None  
See application file for complete search history.

(56) References Cited

U.S. PATENT DOCUMENTS

| | | | |
|---|---|---|---|
| 6,084,979 | A | 7/2000 | Kanade et al. |
| 6,115,052 | A | 9/2000 | Freeman et al. |
| 6,269,172 | B1 | 7/2001 | Rehg et al. |
| 6,674,877 | B1 | 1/2004 | Jojic et al. |
| 7,986,828 | B2 | 7/2011 | Rao et al. |

(Continued)

OTHER PUBLICATIONS

Katz, S., & Tal, A. (2003). Hierarchical mesh decomposition using fuzzy clustering and cuts (vol. 22, No. 3, pp. 954-961). ACM.*

(Continued)

*Primary Examiner* — Sumati Lefkowitz  
*Assistant Examiner* — David Perlman  
(74) *Attorney, Agent, or Firm* — Crawford Maunu PLLC

(57) ABSTRACT

A variety of methods, systems, devices and arrangements are implemented for use with motion capture. One such method is implemented for identifying salient points from three-dimensional image data. The method involves the execution of instructions on a computer system to generate a three-dimensional surface mesh from the three-dimensional image data. Lengths of possible paths from a plurality of points on the three-dimensional surface mesh to a common reference point are categorized. The categorized lengths of possible paths are used to identify a subset of the plurality of points as salient points.

17 Claims, 5 Drawing Sheets

(56) References Cited

U.S. PATENT DOCUMENTS

| | | |
|---|---|---|
| 2003/0197712 A1 | 10/2003 | Dantwala |
| 2004/0252862 A1 | 12/2004 | Camus et al. |
| 2006/0251298 A1 | 11/2006 | Bronstein et al. |
| 2007/0299559 A1 | 12/2007 | Janssen et al. |
| 2008/0031512 A1 | 2/2008 | Mundermann et al. |
| 2008/0180448 A1 | 7/2008 | Anguelov et al. |
| 2008/0309664 A1 | 12/2008 | Zhou et al. |
| 2009/0027402 A1 | 1/2009 | Bakalash et al. |
| 2009/0135190 A1 | 5/2009 | Bakalash et al. |
| 2009/0185746 A1* | 7/2009 | Mian et al. ............ 382/209 |
| 2009/0284529 A1 | 11/2009 | De Aguiar et al. |
| 2010/0197399 A1 | 8/2010 | Geiss |
| 2011/0038516 A1* | 2/2011 | Koehler et al. ........... 382/128 |
| 2011/0044536 A1* | 2/2011 | Cobb et al. ............ 382/165 |

OTHER PUBLICATIONS

Parikh et al. "Feature-based Part Retrieval for Interactive 3D Reassembly." Applications of Computer Vision, WACV '07 Conference, Carnegie Melion University, 6 pgs. (Feb. 2007).

\* cited by examiner

INTELLIGENT PART IDENTIFICATION FOR USE WITH SCENE CHARACTERIZATION OR MOTION CAPTURE

RELATED PATENT DOCUMENT

This patent document is a continuation under 35 U.S.C. §120 of U.S. patent application Ser. No. 12/712,914 filed on Feb. 25, 2010 (U.S. Pat. No. 8,611,670), which is fully incorporated herein by reference.

FEDERALLY-SPONSORED RESEARCH OR DEVELOPMENT

This invention was made with Government support under contract N00014-07-1-0747 awarded by the Department of the Navy ONR. The U.S. Government has certain rights in this invention.

FIELD

Aspects of the present disclosure relate to the field of motion capture and to algorithms that facilitate characterization of a scene and/or the motion capture of a subject, such as by tracking and recording humans, animals and other objects in motion, to identification of features for the subject with or without the use of added markers and/or in real time.

BACKGROUND

Three-dimensional modeling of structures by a computer can be useful for a wide range of applications. Common applications relate to the generation of virtual structures to produce a visual display that depicts the structure. For example, video games often generate in-game characters using virtual models that recreate the motions of real-world actors, athletes, animals or other structures. Similar efforts are often undertaken for computer-generated characters in movies, television shows and other visual displays. The useful applications span areas as diverse as medicine, activity recognition, and entertainment. As robots become more commonplace in settings that include humans, they will need the ability to recognize human physical action.

Increasingly, virtual modeling is moving away from the creation of a cartoon style appearance to more of a photo-realistic display of the virtual sets and actors. It can still take a tremendous effort to create authentic virtual doubles of real-world actors. Creation of a model that captures the muscle, joint, neurological and other intricacies of the human body is a prohibitively difficult proposition due to the sheer number of factors involved. Thus, modeling of a person is often implemented using motion capture of a real-world person. While in recent years, algorithms have been proposed that capture full skeletal motion at near real-time frame rates, they mostly rely on multi-view camera systems and specially controlled recording conditions which limit their applicability. It remains one of the biggest challenges to capture human performances, i.e., motion and possibly dynamic geometry of actors in the real world in order to map them onto virtual doubles.

SUMMARY

Aspects of the present disclosure are directed to overcoming the above-mentioned challenges and others related to the types of applications discussed above and in other applications. These and other aspects of the present disclosure are exemplified in a number of illustrated implementations and applications, some of which are shown in the figures and characterized in the claims section that follows.

Consistent with one embodiment of the present disclosure, a method is implemented for identifying salient points from three-dimensional image data. The method involves the execution of instructions on a computer system to generate a three-dimensional surface mesh from the three-dimensional image data. Lengths of possible paths from a plurality of points on the three-dimensional surface mesh to a common reference point are categorized. The categorized lengths of possible paths are used to identify a subset of the plurality of points as salient points.

Consistent with another embodiment of the present disclosure, a system is implemented for identifying salient points from three-dimensional image data. The system includes at least one processing circuit configured and arranged to generate a three-dimensional surface mesh from the three-dimensional image data. Lengths of possible paths from a plurality of points on the three-dimensional surface mesh to a common reference point are categorized. The categorized lengths of possible paths are used to identify a subset of the plurality of points as salient points.

According to another embodiment of the present disclosure, a method is implemented for determining an orientation for a model of a structure from a sequence of depth-based image frames of the structure. The method is implemented by a processing circuit and for a given image frame of the sequence of image frames. A set of surface meshes is generated from the given image frame, each of the surface meshes including a plurality of vertices connected by edges. Interest points are identified on each surface mesh by selecting a central point on each surface mesh. Geodesic distances between the central point and the plurality of points are determined as a function of edge distances. One or more points on each surface mesh are selected based upon the determined geodesic distances. An orientation for identified interest points of a surface mesh is determined as a function of a path between each identified interest point and corresponding vertices connecting the identified interest point to a corresponding central point. The set of surface meshes are classified according to a set of parts of the model of the structure by selecting subsets of the image frame of the sequence of image frames that include a corresponding one of the identified interest points. A correlation between candidate locations of the set of parts and the selected subsets of the image frame is assessed.

The above summary is not intended to describe each illustrated embodiment or every implementation of the present disclosure.

BRIEF DESCRIPTION OF THE DRAWINGS

The disclosure may be more completely understood in consideration of the detailed description of various embodiments of the disclosure that follows in connection with the accompanying drawings as follows.

Figure 1A:
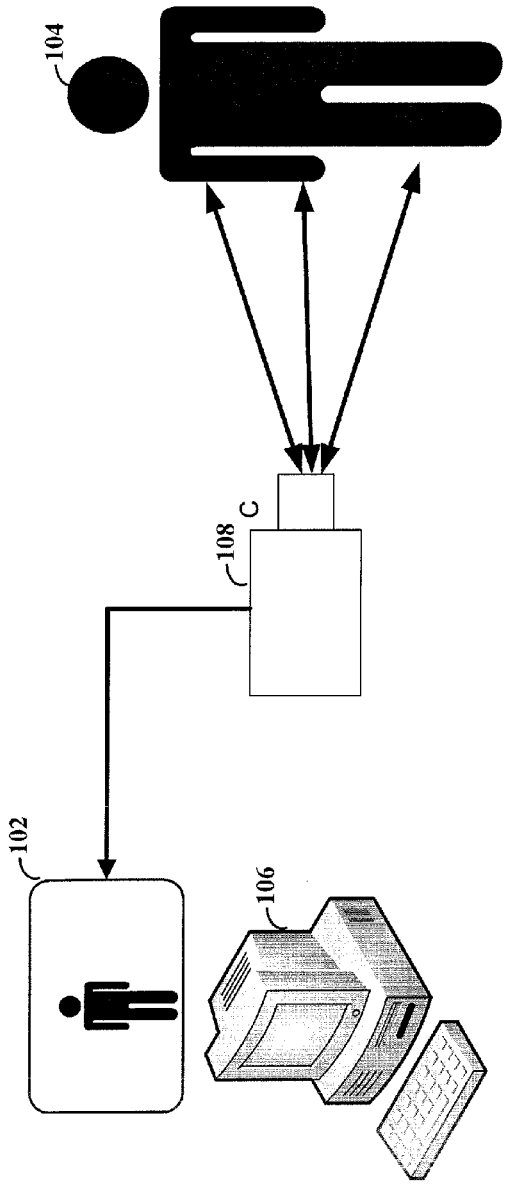
FIG. 1A depicts an image sensor and processor arrangement, consistent with an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure are believed to be useful for capturing and reconstructing structures from image data, such as video-based performances of real-life subjects, whether human, animal, man-made or otherwise. Specific applications of the present disclosure facilitate marker-less motion capture of subjects in an efficient and/or automated fashion including automated identification of features from depth-based sensor data. While the present disclosure is not necessarily limited to such applications, various aspects of the disclosure may be appreciated through a discussion of various examples using this context.

According to an embodiment of the present disclosure, motion capture is implemented to track the motion of one or more objects. The motion capture is implemented on a processing circuit that is configured to automatically identify (probabilistic) locations of selected parts of the one or more objects from image data. The identified part locations are used in connection with a probabilistic model of the one or more objects. The probabilistic model helps determine the location and orientation of the objects with respect to the identified locations of the selected parts. Moreover, the developed system can be applied to single depth images in order to realize contact-free scene understanding capabilities. In particular implementations, this can be implemented irrespective of motion of the subjects and/or sequences of images.

Many of the implementations discussed herein are particularly well-suited for use with a monocular sensor (e.g., a time-of-flight (TOF) sensor) that provides depth-based image data. The depth-based image data includes depth information for pixels of the image. The implementations and embodiments are not limited to only such applications and can be used in combination with a variety of data-types and sensors. For instance, aspects of the present disclosure may be particularly useful for supplementing or being supplemented by, traditional image capture devices based upon visible light intensities and/or colors.

Particular aspects of the present disclosure relate to detecting and identifying body parts in range images and at video frame rates. An interest point detector identifies salient regions on surface meshes generated from depth-based/range data that includes an object for modeling. Such aspects can be particularly well suited for analyzing the human shape. Aspects are directed toward the identification of features/interest points useful for characterizing the orientation/pose of the particular object, and particularly, automated identification thereof. For instance, various interest points can be assessed and selected by first identifying geodesic extrema on a surface mesh generated from the range data. Salient points on the body, such as the hands, feet, head or shoulders are then determined or classified. Estimations for a three-dimensional orientation of the salient points can also be determined.

One or more of the algorithms of the present disclosure make use of image data to identify object parts and associated orientations for tracking motion of the object. Various aspects of the present disclosure are particularly useful for such motion tracking in connection with a monocular image capture sensor. These and other aspects are also particularly useful for real-time modeling of the object from such an image capture sensor. In particular, a depth based image capture sensor can be used. One example is a time-of-flight (TOF) sensor that captures image data by measuring the time that it takes a particle or acoustic, electromagnetic or other wave to travel to objects captured in the image. In this manner, the sensor provides a depth-based image for which pixels of the image are defined as a function of their depths (e.g., relative distances from the sensor).

Turning now to the figures, FIG. 1A depicts an image sensor and processor arrangement, consistent with an embodiment of the present disclosure. Image sensor 108 captures image data 102, which includes structure 104. The flexibility of various embodiments of the present disclosure facilitates the use of a wide variety of sensors for image sensor 108. In a particular implementation, image sensor 108 is implemented using a time-of-flight (TOF) sensor arrangement that provides depth measurements for structure 104 and other objects in the field of view.

Structure 104 is shown as a human; however, embodiments of the present disclosure are not so limited. For instance, various embodiments of the present disclosure are particularly well-suited for motion capture of structures for which skeletal modeling is appropriate. Other embodiments are also possible, particularly structures that can be modeled by a reasonable number of candidate poses defined by a set of movement constraints for various portions of the structure.

In specific implementations, image data 102 includes data that can be used to determine depth of objects within the field of view of image sensor 108. This data is provided to a processing device 106. Processing device 106 is depicted as a computer system; however, various processing circuits can be used. Moreover, combinations of multiple computers, hardware logic and software can be used. In a particular implementation, processing device 106 includes a parallel processor, such as a graphics processing unit (GPU). Processing device 106 uses the image data to generate a digital representation of the structure 104.

Figure 1B:
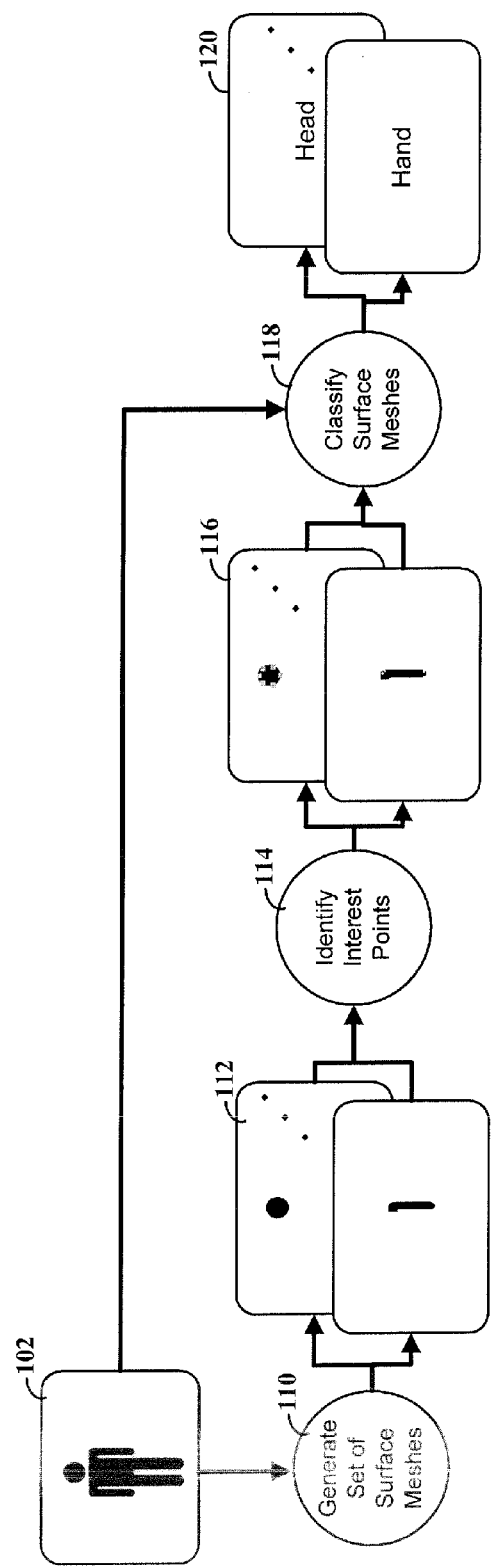
FIG. 1B depicts a flow diagram for identifying part locations of the object, consistent with an embodiment of the present disclosure.

FIG. 1B depicts a flow diagram for identifying part locations of the object, consistent with an embodiment of the present disclosure. Image data 102 includes a set of points, or pixels, defined in terms of an X-Y position and also by depth measurements. Processing is undertaken 110, to generate, from these pixels, a set of one or more surface meshes 112. The set of surface meshes 112 are processed 114 to identify interest points. The resulting set 116 of surface meshes with identified interest points are used to classify 118 the surface meshes according to part, location and/or orientation. For instance, the surface meshes can be classified as corresponding to a head, hand, foot, shoulder or other body part, as shown by 120.

In particular implementations, the classification of surface meshes can include a confidence factor that quantifies the probability that the classification is correct. This confidence level can be used to sort the surface meshes and to intelligently select from potential poses for the object.

Embodiments of the present disclosure relate to the identification of interest points by relative distances from a relatively centralized point for each of the surface meshes. For instance, each point on the surface mesh can be defined in terms of a respective length of the shortest path from the point to the centralized point. This geodesic distance can be used to find points of interest or feature points on the surface meshes. These feature points are then used as part of the classification algorithm. Consistent with a particular embodiment, the system does not require an explicitly identified central point but rather starts directly at the two points defining the longest path on the mesh.

Another variant of the method considers not only the geodesic distances between points, but also additional factors such as local curvature, surface discontinuities, point colors or intensity remission values. These factors are incorporated into the distance function that is used to find shortest paths between vertices—which, in turn, define the selection of interest points.

In another variant, two-dimensional images (e.g., intensity and/or color) can be used in the determination of image-based distant measurements of edge costs in the surface graph. The system can use the shortest path information and image segmentation information obtained from such the two-dimensional images to perform the measurements. For instance, the pixel-distance of paths can be adjusted (or "weighted") based upon the similarity of color, image texture and image gradient of the paths. These factors can be incorporated into a cost function for neighboring pixel pairs, which can be particularly useful for intensity images—including the estimation of orientation vectors for interest points as well as the classification of body parts based on local image patches.

Other variations allow for the combination of depth-based image data with intensity based image data (e.g., where both information types are available). This can include, for instance, the system selecting between one of the different distance algorithms and/or use of multiple algorithms to identify multiple points of interest and/or to average distances. This can be particularly useful to improve the robustness of the algorithm(s) as each of the algorithms can have different strengths and weaknesses relative to particular images, motions and capture-based considerations.

Other aspects of the present disclosure are directed toward automated, or semi-automated, learning algorithms useful for classifying surface meshes according to part classifications. These learning algorithms can be implemented per frame (e.g., in real-time) and/or as part of an off-line learning stage.

Figure 2:
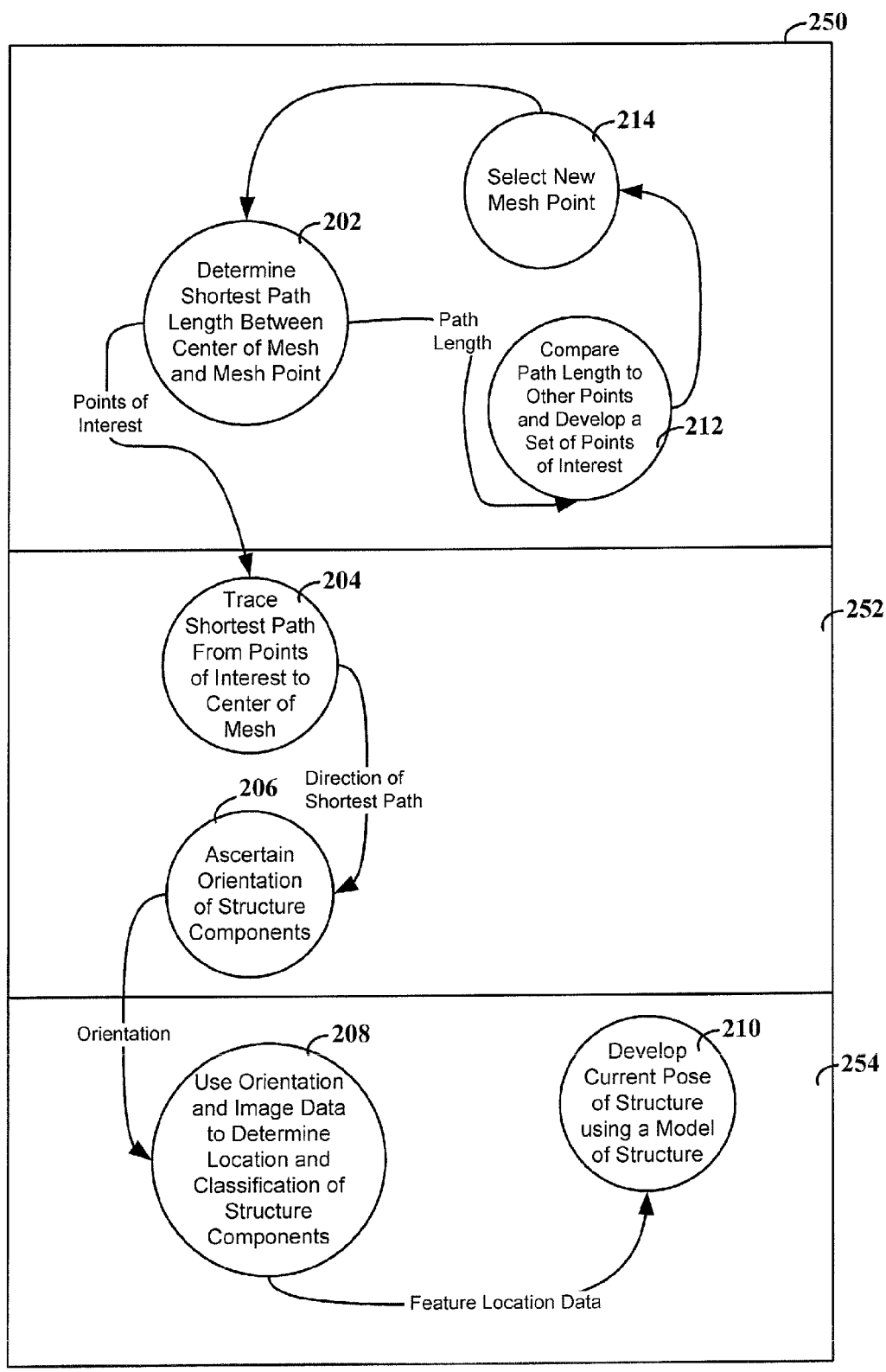
FIG. 2 depicts a flow diagram for identifying relevant points of interest, consistent with embodiments of the present disclosure.

In this context, FIG. 2 depicts a flow diagram for identifying relevant points of interest, consistent with embodiments of the present disclosure. Conceptually, the algorithms associated with FIG. 2 can be thought of as being separable into three main components, 250, 252 and 254. Component 250 identifies points of interest for surface meshes generated from the depth-based image data. Component 252 uses the identified points and the image data to determine an orientation for the surface mesh. Component 254 develops a current pose for the structure.

More specifically, at step 202 the shortest path length from a particular point and a center of the associated surface mash is determined. Step 214 involves the selection of new points. For these new points, respective path lengths are also determined. From these determined path lengths a set of interested points is developed, as depicted by step 212. The steps are depicted as being sequentially implemented, however, path lengths and other functions can be implemented in a parallel manner. Other variations from the specific sequence and methodology are also possible.

At step 204 a path is traced from the identified points of interest to the center of the mesh. An orientation for the mesh/structure components is then ascertained from these tracings, as shown by step 206.

The interest points, their orientation and other parameters are then used, at step 208, to classify and/or determine the location of the structure components. A current pose for the model is then developed, at step 210, from such feature identification, location and/or classification.

The following discussion relates to an experimental implementation in which features are identified for a human. The present disclosure is not so limited, however, and it should be apparent that such experimental implementation can be modified and/or applied to a variety of different implementations.

The experimental implementation was configured to extract information about human body parts, such as their visibility or their location and orientation in space, from range images. In the relevant discussion, a range image is defined as a set $R=\{r_{i,j}\}$, $i=1, \ldots, n$, $j=1, \ldots, m$, $r_{i,j} \in \mathbb{R}$ of distance measurements $r_{i,j}$ relative to a camera location $c \in \mathbb{R}^3$ and orientation $\theta \in SO(3)$.

In a preprocessing step, the distance measurements are transformed into a 3D point cloud using the known camera calibration and truncated according to a bounding box. The preprocessing step involves the removal of noise and measurement artifacts from the depth images. For instance, for every image pixel, a set of unobserved distances are assumed that contribute to the formation of the corresponding depth measurement. The developed preprocessing method selects these unobserved distances so that (a) they are consistent to neighboring unobserved distances and (b) their combination explains the measured depth value at the corresponding pixel as well. Furthermore, the developed method removes single 3D points from the point cloud that are not consistent with their local surrounding. In effect, the preprocessing method transforms the noisy depth images into a set of coherent 3D structures.

The specific sensor used in the experiments was the Swissranger SR4000 time-of-flight camera by MESA Imaging AG, Switzerland, but most other range sensors such as laser range finders would be applicable as well. The SR4000 sensor yields 176×144 pixels at 30 frames per second. In the experiment, the sensor was rotated by 90 degrees to better match the dimensions of different recorded human subjects.

The experiment attempted to estimate for every range image a set $\mathscr{D} = \{(c_d, x_d, \theta_d)\}_{d=1}^{D}$ of body part detections including class assignments $c_d \in \{head; hand; shoulder; foot\}$, part locations $x_d \in \mathbb{R}^3$ and optionally their orientations $\theta_d \in SO(3)$. Consideration was given as to whether these detections could be available at a high frame rate so that dependent higher-level functions, such as a module for human-robot interaction, would not suffer from time delays.

As detailed in the following, the experiment involved a bottom-up approach that was implemented by identifying and classifying potential body part location directly from the range data as opposed to, for instance, first fitting a full-body model of the human subject and inferring the body part configurations in a top-down fashion.

The experiment used an algorithm for identifying a novel type of interesting point based on geodesic distance between vertices in a mesh that is tailored for human part detection in range data. This particular interest point detector is believed to be particularly useful for providing a stable estimate of local pose which can be used to normalize image patches prior to feature extraction.

The experimental implementation used a detection pipeline that consisted of the following steps. First, a set of surface meshes were constructed from the point cloud representative of sensor data. Next, interest points were identified on the surface meshes. Local descriptor patches were then extracted for these interest points. The descriptors were then classified to body part classes. Finally, the patches were sorted according to a classifier confidence.

Figure 3:
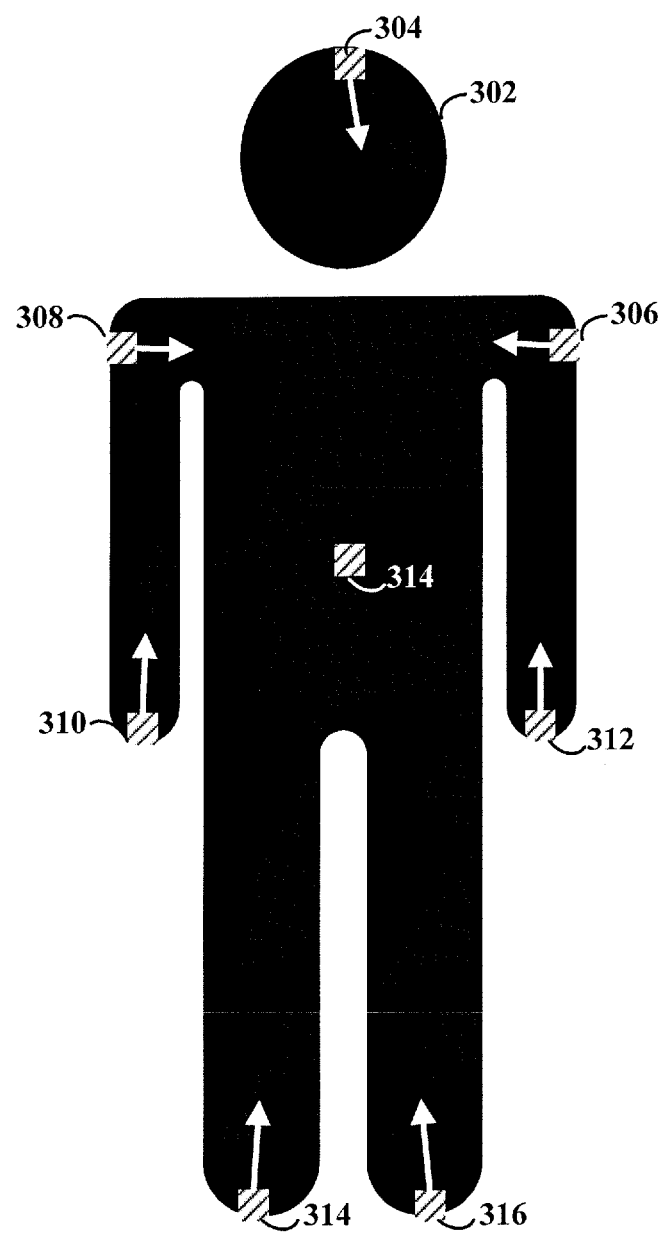
FIG. 3 depicts a set of identified interest points and orientations, consistent with embodiments of the present disclosure.

FIG. 3 depicts a set of identified interest points and orientations, consistent with embodiments of the present disclosure. Structure 302 (e.g., a person or other object) produces a set of image data points obtained from a depth-based sensor. From this set of image data points, particular points of interest are identified. Orientations are also determined for these identified points.

For instance, identification of salient regions, such as the hands 310, 312, feet 314, 316, head 304, shoulders 306, 308 and torso 314, was possible in the experimental implementation with a relatively low-computational cost. The interest points were identified that had the longest of the shortest paths on a surface mesh and also used to estimate an orientation vector for the identified interest points. These interest points are termed AGEX, Accumulative Geodesic EXtrema, since they can be computed by incrementally maximizing geodesic distances on the surface mesh.

For a given mesh, M and k>=1 the sets $AGEX_{k-1}(M)$ are recursively defined as follows. For all k>1, $AGEX_k(M)$ extends $AGEX_{k-1}(M)$ by a vertex p∈M that maximizes the geodesic distance to all vertices contained in $AGEX_{k-1}(M)$. $AGEX_1(M)$ contains exactly one vertex: the geodesic centroid of the mesh.

The initialization of $AGEX_1$ can be set to values other than the geodesic centroid of the mesh, which is a relatively simple solution. For instance, it is also possible to start the process at $AGEX_2$ and to define this set as containing the endpoints of the longest path on the mesh surface. Additional initialization possibilities are also contemplated.

In one implementation, $AGEX_k(M)$ can be computed in an iterative way using a suitable algorithm. One example, non-limiting, algorithm is that of Dijkstra's algorithm. The acquired surface mesh is considered as a graph: mesh points become the vertices of the graph and edges are created for neighboring mesh points. Points are considered neighbors, if (a) the corresponding pixels in the depth image are neighbors and (b) their distance in 3D scene space does not exceed a threshold $\delta_{connected}$. Next the geodesic centroid ($v_c$) of the mesh is considered (the starting situation $AGEX_1(M)=\{v_c\}$). The shortest path is calculated to all other vertices, e.g., following Dijkstra's algorithm. The vertex $v_s$ corresponds to the longest of these shortest paths. This vertex $v_s$ is added to the interest point set to yield $AGEX_2(M)=AGEX_1(M) \cup v_s$. A zero-cost edge is then added between the $v_c$ and $v_s$, and the shortest paths are updated. This process is repeated until k vertices have been added to the interest point set.

In an experimental implementation, the runtime of Dijkstra's algorithm per iteration is $O(|E|+|V|\log|V|)$, where |E| is the number of edges in the graph and |V| is the number of vertices. For example, an 8-neighborhood of depth image pixels for which the shortest path algorithm is run k times, results in $O(k \cdot (8n+n \log(n)))$, where n is the number of vertices. Assuming that the number of vertices is bounded by the relatively low number of available depth image pixels and there are less then k=20 interest points, the computational cost for computing $AGEX_k(M)$ is relatively low.

An orientation is then assigned to each extracted interest point $k_i$ in a natural way by "tracing back" the shortest path that lead to its detection. For instance, the graph vertex corresponding to the interest point is marked, and the matrix of path costs produced by Dijkstra's algorithm is then considered. The shortest incoming edges are successively followed to neighboring vertices until a maximal geodesic distance of $\delta_{orient}$ to a point p is reached. The resulting vector $o_i=k_i-p$ is treated as the 3D orientation of the interest point $k_i$.

Local range image patches extracted at interest point locations are normalized by their estimated orientation (i.e., the patches have been rotated such that the orientation vector points downwards). This normalization step brings the main features of each class to a close alignment, which in turn, makes learning and classification significantly easier.

As alternative local descriptors, the system can use 3D histograms of measured points in the local neighborhood of the interest points—potentially orientation-normalized using the extracted orientation vector. Other, non-limiting, alternatives for descriptors include curvature statistics, discontinuities and statistics of the pixel intensities.

Figure 4:
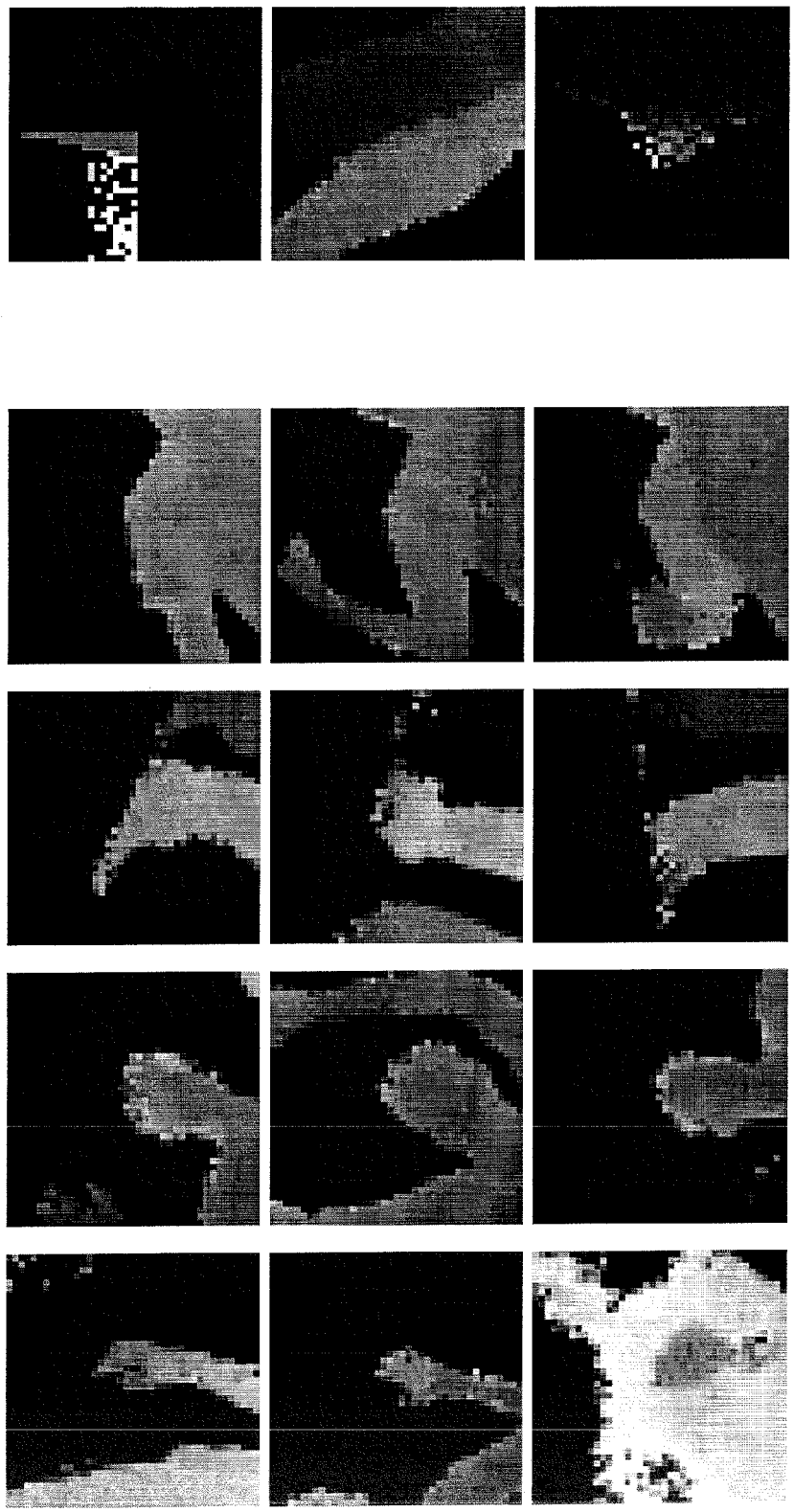
FIG. 4 depicts examples of local descriptor patches for the different body part classes, consistent with embodiments of the present disclosure.

FIG. 4 depicts examples of local descriptor patches for the different body part classes, consistent with embodiments of the present disclosure. The depicted patches can be automatically centered at their interest point locations and orientation-normalized using the respective orientation estimates. The detection algorithm presented herein can be executed for all subsets of connected meshes and, thus, can be particularly useful for dealing with situations in which a mesh falls into several parts, e.g., due to occlusions in the range image. The resulting interest point set approximates a uniform distribution over the mesh surface and it grows incrementally with k to eventually contain all mesh points. Other aspects of the present disclosure recognize that $AGEX_k(M)$ is not a uniquely identified set of points. If several points p∈M maximize the geodesic distance to all points in $AGEX_{k-1}(M)$, a random point can then be chosen to extend the set. The orientation estimates can be particularly useful to normalize local shape descriptors, which are to be used to classify points.

The set of interest points resulting from the detection algorithm can then be used as the hypothesis space for potential body part locations. Aspects of the present disclosure also relate to learning and applying classifiers for local patch descriptors that assign body part labels to the interest points. One alternative to the explicit pre-selection of potential locations for detection is the so-called sliding window approach. Here, a set of learned patch classifiers is applied to the entire image (or a higher dimensional state space) in a partially overlapping fashion. The local maxima of the classifier responses are then taken as detection results.

Experimental evaluation suggests that the AGEX interest points outperform the sliding window approach by a large margin in particular applications. This is believed to be due to the fact that there is a large overlap between the sets of AGEX points and the true locations of the considered body parts, which considerably constrains the hypothesis space, and the normalization of the patch descriptors by the estimated orientation drastically reduces the intra-class variability which the classifier has to learn and represent. Both aspects serve to improve the generalization performance of the algorithm.

For an experimental implementation with local descriptors at interest points, 41×41 depth image patches surrounding the interest point were considered. The patch was rotated with respect to the estimated interest point orientation in order to have the local orientation point in a conical direction. The result is a set of patches from the image that are highly likely to be centered on a salient part of the human body which serve as candidates. A particular example pertains to the task of indentifying the hands, feet, head or shoulders.

Aspects of the present disclosure allow for a flexible use of different algorithms, processes and hardware. An example implementation uses the open-source STAIR Vision library object detection pipeline. This requires large quantity of negative examples, i.e., patches of the background or other parts not of interest. While such a training set could be created through manual labeling, this can be tedious and error-prone.

As an alternative to manual labeling, training data can be obtained by simultaneous recording with an active-marker based PhaseSpace motion capture system. This system consists of four cameras and several visible light LED (light-emitting diode) markers placed on parts to be detected. The LEDs in the PhaseSystem encode their unique ID. Thus, the output of the motion capture system is the three-dimensional location of distinct markers with sub-millimeter accuracy. The coordinate systems of the depth sensor and the PhaseSpace system can be registered through manually corresponding measured data with marker locations. With sufficient pairs of corresponding three-dimensional points in the two frames, the rigid transformation can be determined between two frames in closed form using a Singular Value Decomposition (SVD). Experimental verification suggests that the markers do not show up in the depth camera images, which is explained by the fact that SR4000 only responds to surfaces that reflect infrared light it emits. Therefore, the markers were not used by the classifiers.

The training set consists of 789 recorded frames and 6312 extracted patches. The time requirements for learning all classifiers on a dual-core desktop PC were approximately 240 minutes per class.

Variations of the algorithms of this disclosure were tested and evaluated using a recording of two 430 frame sequences. These sequences involve a variety of movements of the entire body. The raw depth sensor data was preprocessed by applying removing points that fall outside a 2 m wide, 2.5 m tall and 1.5 m deep bounding box in front of the sensor, and median filtering which primarily remove artifacts that arise at depth discontinuities. The system ran in real-time on a Quadcore 2.66 GHz desktop computer running Linux.

The tested algorithm (AGEX) modifies the sliding window object detection pipeline by constraining both training patches and test candidates to be centered on AGEX keypoints and rotated such that the estimated orientation points are in a consistent direction. To evaluate this algorithm, it was compared against a baseline algorithm (SW) that uses the same state-of-the-art classification algorithms. This SW algorithm was trained using a standard paradigm of extracting patches from the image, with all patches containing parts of interest as positive examples and a large number of random patches in the scene that either contain other parts or the background. The AGEX algorithm produced confidences for each extracted key point using the trained classifiers. The SW algorithm uses a sliding window to consider all possible patches in the scene. Detections are filtered using non-maximal suppression with non-maximal suppression.

Figure 5:
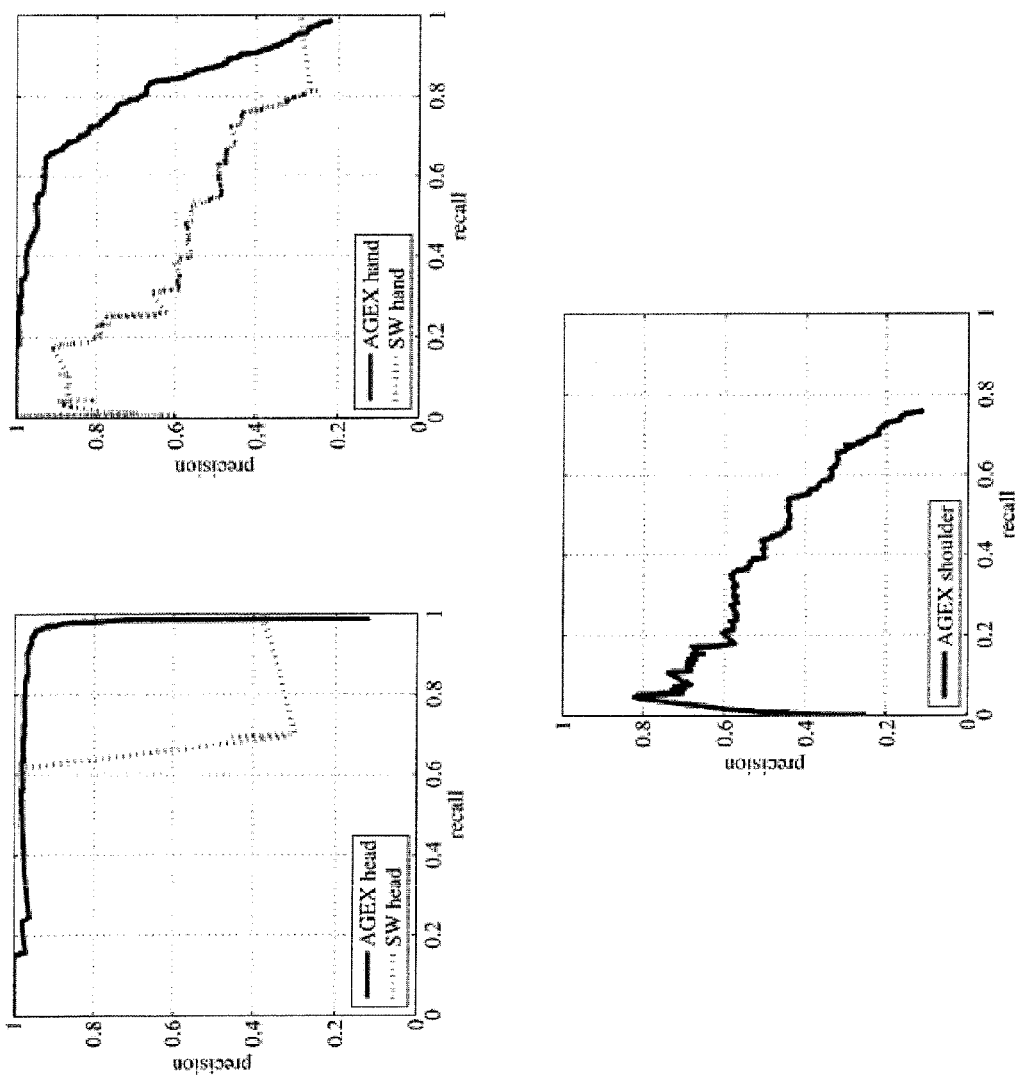
FIG. 5 depicts experimental results for precision/recall curves for the sliding window detector and AGEX for the classes hand, head, shoulder and foot, consistent with embodiments of the present disclosure.

FIG. 5 depicts experimental results for precision/recall curves for the sliding window detector and AGEX for the classes hand, head, shoulder and foot, consistent with embodiments of the present disclosure. These curves were created by sorting the object detections produced by the two algorithms by classifier confidence. A computer vision metric was used, which involved considering a detection to be correct when the area intersection of the detected bounding box and the true bounding box divided by the union of the areas is greater than 0.5. The precision and recall was evaluated at all possible thresholds. At high confidences, the precision is higher which causes recall to suffer. As the confidence threshold lowers, recall increases. As the graphs show, both algorithms are fairly good at identifying the head of a human. The detector of the present disclosure, however, showed significantly higher precision as the recall increases, whereas the comparison detector fails rapidly. The head is a body part that usually has a consistent orientation during standard movements of a human, and therefore increased recall can be a particularly useful aspect. When identifying hands, the performance of the algorithms is much different. The experiment suggests that AGEX performs significantly better across the range of recall levels. Unfortunately, the training procedure for shoulders for the SW algorithm failed after a long training period because of issues involving the large negative training example set, but we show our performance on the shoulder problem.

The experiment also involved determining how many false negatives were caused simply by the fact that consideration was restricted to AGEX keypoints. This was evaluated on the test set and it was found that 402/407, or 98% of the patches containing the head were in AGEX. The respective numbers for hands and shoulders were 735/851 (86.4%) and 380/499 (76.15%). Thus, the maximum recall did not suffer, but precision increased significantly by allowing the classifiers to only need to learn the distinction between types of normalized AGEX patches, thereby making the learning problem simpler. At the same time, AGEX algorithm uses fewer negative training examples and makes better use of them. At test time, rather than considering all possible windows and scales, AGEX only needs to consider 5 patches centered around points in AGEX, which represents a significant decrease in computational complexity.

While TOF sensors represent a particularly simple mechanism for generating depth-based image data, other mechanisms are possible. For instance, stereo reconstruction from multiple images can be used to produce depth-based image data. In another example, pattern projection can be used.

The various embodiments as discussed herein may be implemented using a variety of structures, related operations and functions. For instance, while many of the descriptions herein may involve software or firmware that plays a role in implementing various functions, various embodiments are directed to implementations in which the hardware includes all necessary resources for such adaptation, without necessarily requiring any involvement of software and/or firmware. Also, various descriptions herein can include hardware having a number of interacting state machines. Moreover, aspects of these and other embodiments may include implementations in which the hardware is organized into a different set and/or number of state machines, including a single state machine, as well as random-logic implementations that may not be clearly mapped to any number of finite-state machines. While various embodiments can be realized via hardware description language that is computer-synthesized to a library of standard modules, aspects of the disclosure should also be understood to cover other implementations including, but not limited to, field-programmable or masked gate arrays, seas of gates, optical circuits, board designs composed of standard circuits, microcode implementations, and software- and firmware-dominated implementations in which most or all of the functions described as being implemented by hardware herein are instead accomplished by software or firmware running on a general- or special-purpose processor. These embodiments may also be used in combination, for example certain functions can be implemented using programmable logic that generates an output that is provided as an input to a processor.

Aspects of the present disclosure relate to capture of life-like motion data, and real-time representations thereof. It will be understood by those skilled in the relevant art that the above-described implementations are merely exemplary, and many changes can be made without departing from the true spirit and scope of the present disclosure. Therefore, it is intended by the appended claims to cover all such changes and modifications that come within the true spirit and scope of this disclosure.

What is claimed is:

1. A method comprising:
generating a three-dimensional surface mesh from three-dimensional (3D) image data corresponding to a physical structure;
categorizing lengths of paths on the three-dimensional surface mesh according to geodesic distances between a plurality of points on the three-dimensional surface mesh and a common reference point, the paths connected to one or more points of the plurality of points on the three-dimensional surface mesh;
identifying a subset of the plurality of points as salient points based upon the categorized lengths of paths and therefrom characterizing the physical structure including body part types; and
using descriptor patches for each of different body part types, wherein the descriptor patches correspond to subsets of the mesh and approximate a uniform distribution over the mesh surface.

2. The method of claim 1, further including performing the steps of generating, categorizing and identifying by executing instructions on a computer system, and further performing a step of determining geodesic distances between points of the plurality of points and therefrom, selecting points of the plurality of points that are endpoints of the longest determined geodesic distances.

3. The method of claim 1, further including performing the steps of generating, categorizing and identifying by executing instructions on a computer system, and wherein executing instructions on a computer system includes identifying the orientation of the salient points according to a direction determined from tracing calculated longest surface paths relative to a center reference of the surface mesh.

4. The method of claim 1, further including performing the steps of generating, categorizing and identifying by executing instructions on a computer system to extract local descriptors at the salient points and classify the local descriptors according to body part type.

5. The method of claim 1, further including the step of using a depth camera to acquire the three-dimensional image data.

6. The method of claim 1, further including the step of using stereo reconstruction to produce the three-dimensional image data.

7. The method of claim 1 wherein 3D image data is acquired using pattern projection to produce the three-dimensional image data.

8. The method of claim 1, further including executing an algorithm as a function of a segmented 2D image.

9. The method of claim 1, further including developing or characterizing a set of part types by learning a set of local descriptors from training data.

10. The method of claim 1, further including determining a plurality of paths on the surface mesh and including determining respective path lengths between points on the surface mesh and selecting path lengths as a function of respective lengths.

11. The method of claim 1, further including at least one of the following steps: using a depth camera to acquire the three-dimensional image data; and using stereo reconstruction to produce the three-dimensional image data; and further including at least one of: wherein 3D image data is acquired using pattern projection to produce the three-dimensional image data; and developing or characterizing a set of part types by learning a set of local descriptors from training data.

12. A method comprising:
generating a three-dimensional surface mesh from three-dimensional image data corresponding to a physical structure;
categorizing lengths of paths on the three-dimensional surface mesh according to geodesic distances between a plurality of points on the three-dimensional surface mesh and a common reference point, the paths connected to one or more points of the plurality of points on the three-dimensional surface mesh;
identifying a subset of the plurality of points as salient points based upon the categorized lengths of paths and therefrom characterizing the physical structure including body part types;
using descriptor patches for each of different body part types, wherein the descriptor patches correspond to subsets of the mesh and approximate a uniform distribution over the mesh surface; and
removing noise and measurement artifacts from the characterized physical structure.

13. The method of claim 12, further including performing depth measurements corresponding to the three-dimensional surface mesh, and identifying a constellation of unobserved structures from the depth measurements and removing depth measurements that are inconsistent with the identified constellation of unobserved structures that surround the depth measurements.

14. The method of claim 13, wherein removing the three-dimensional depth measurements includes removing depth measurements that exceed a threshold distance from depth measurements of identified constellation of unobserved structures that surround the depth measurements.

15. A method comprising:
generating a three-dimensional surface mesh from three-dimensional (3D) image data corresponding to a physical structure;
categorizing lengths of paths on the three-dimensional surface mesh according to geodesic distances between a plurality of points on the three-dimensional surface mesh and a common reference point, the paths connected to one or more points of the plurality of points on the three-dimensional surface mesh;
identifying a subset of the plurality of points as salient points based upon the categorized lengths of paths;
according to a set of parts of a model representing the structure, extracting local descriptors associated with the salient points and selecting subsets of the three-dimensional image data that include a corresponding one of the salient points, and therefrom characterizing the physical structure including body part types; and
using descriptor patches for each of different body part types, wherein the descriptor patches correspond to subsets of the mesh and approximate a uniform distribution over the mesh surface.

16. The method of claim 15, further including assessing a correlation between candidate locations of the set of parts and the selected subsets of the three-dimensional image data.

17. An apparatus comprising:
means, including a computer processing circuit, for generating a three-dimensional surface mesh from three-dimensional (3D) image data corresponding to a physical structure;
means, including a computer processing circuit, for categorizing lengths of paths on the three-dimensional surface mesh according to geodesic distances between a plurality of points on the three-dimensional surface mesh and a common reference point, the paths connected to one or more points of the plurality of points on the three-dimensional surface mesh;
means, including a computer processing circuit, for identifying a subset of the plurality of points as salient points based upon the categorized lengths of paths; and
according to a set of parts of a model representing the structure,
means, including a computer processing circuit, for extracting local descriptors associated with the salient points and selecting subsets of the three-dimensional image data that include a corresponding one of the salient points, and therefrom characterizing the physical structure including body part types, and assessing a correlation between candidate locations of the set of parts and the selected subsets of the three-dimensional image data, and
wherein at least one of the above-recited means is configured to use descriptor patches for each of different body part types, wherein the descriptor patches correspond to subsets of the mesh and approximate a uniform distribution over the mesh surface.

* * * * *